(12) United States Patent
Patel et al.

(10) Patent No.: US 6,389,017 B1
(45) Date of Patent: May 14, 2002

(54) RESOURCE SCHEDULING ALGORITHM IN PACKET SWITCHED NETWORKS WITH MULTIPLE ALTERNATE LINKS

(75) Inventors: Naresh Patel, San Jose; Karim Harzallah, Mountain View, both of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/211,696

(22) Filed: Dec. 14, 1998

(51) Int. Cl.[7] .......................... H04L 12/28; H04L 12/56
(52) U.S. Cl. ........................................ 370/389; 370/360
(58) Field of Search ................................ 370/389, 351, 370/353, 356, 359, 360, 395, 413, 419, 423, 398, 400, 406, 407, 408; 709/230, 239, 240, 242, 252

(56) References Cited

U.S. PATENT DOCUMENTS 5,740,346 A * 4/1998 Wicki et al. .................. 714/22
6,188,686 B1 * 2/2001 Smith ......................... 370/388

* cited by examiner

*Primary Examiner*—Douglas Olms
*Assistant Examiner*—Phirin Sam
(74) *Attorney, Agent, or Firm*—Leah Sherry; Oppenheimer Wolff & Donnelly LLP

(57) ABSTRACT

A system and method for scheduling packets between multiple links of an adaptive set utilizes a destination register or a cache line associated with each of the alternate links of the network switch. Each of the cache lines holds the destination of the last packet that used the link. Upon arrival, a packet associatively checks the content of all cache lines. If it hits, then it uses the corresponding link; otherwise, the packet is scheduled according to a round-robin policy or other default policy.

7 Claims, 2 Drawing Sheets

Router Block Diagram

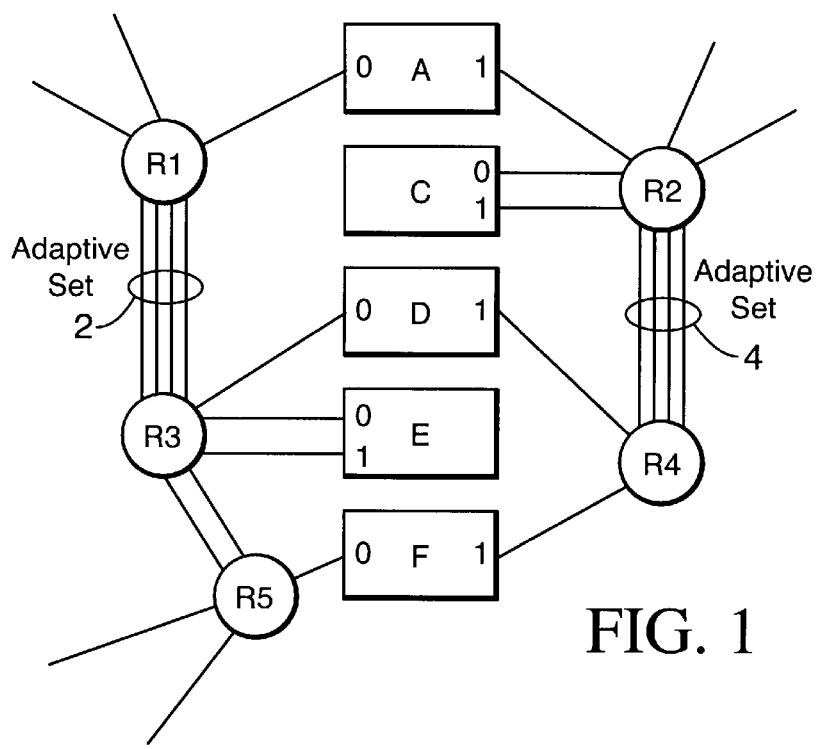
FIG. 1
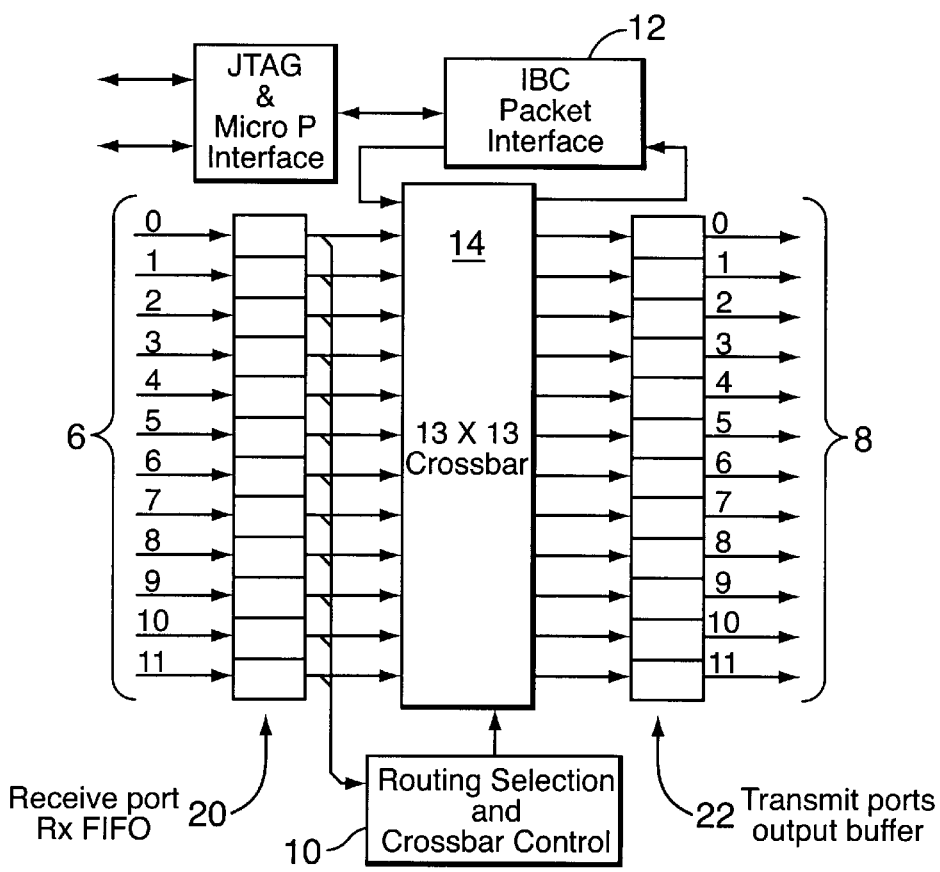
FIG. 2   Router Block Diagram

Fat pipe with two physical links

| | DID | FPID | OP# | |
|---|---|---|---|---|
| port 0 | DID [0] | FPID [0] | OP# [0] | |
| port 1 | DID [1] | FPID [1] | OP# [1] | |
| ⋮ | ⋮ | ⋮ | ⋮ | |
| port 10 | DID [10] | FPID [10] | OP# [10] | |
| port 11 | DID [11] | FPID [11] | OP# [11] | |

RESOURCE SCHEDULING ALGORITHM IN PACKET SWITCHED NETWORKS WITH MULTIPLE ALTERNATE LINKS

BACKGROUND OF THE INVENTION

Multi-link routing algorithms are well known in the field of wide area networks (WANs) and are used to optimize performance.

A key distinction among multi-link routing algorithms is the amount of assumed knowledge about the state of the network. It is clear that making use of more information leads to better algorithms. Central concerns in devising a new scheduling scheme include: (i) deciding what information to use, (ii) determining the cost of collecting such information, and (iii) deciding when additional information will lead to improved performance sufficient to justify its inclusion.

In wide area networks, Shortest Path First (SPF) was proposed as a way to select among alternate paths. SPF performs well when the traffic is light and changing slowly, however under heavy and dynamic traffic the routing algorithm suffers from severe congestion and results in degradation of the network performance. Many of the problems are associated with the distance estimation procedure of the algorithm. SPF-EE4 (Shortest Path First with Emergency Exits) attempts to eliminate the problems associated with the SPF (Shortest Path First) algorithm by using alternate path only as emergency exit.

Multiple links between routers in a system area network may be configured as an adaptive sets or "fat pipes". Multi-port routers are cascaded to create arbitrary network topologies. The presence of multiple ports allows for a wide variety of substantial connectivity. However, providing sustained network throughput can present some difficulties. Failure to consider the fan-in to the router-router links within the network can produce system topologies with substantial bottlenecks.

Configuring multiple links between routers to act as "fat pipes" allows the router hardware to dynamically select an output port based on recent message traffic. Multi-link routing algorithms used in switches are similar to algorithms used in WANs, but there are significant differences. Most importantly, it is critical for high-speed switching to take arriving traffic and quickly send it out on the appropriate output link. This places major constraints on the computational complexity of the scheduling task, and thus excludes many of the multipath routing solutions based on expected response time.

SUMMARY OF THE INVENTION

According to one aspect of the invention, a Destination Based Scheduling (DBS) algorithm is utilized to schedule incoming packets between multiple links of a fat pipe. The DBS algorithm binds packets targeting the same destination to the same physical link in a multiple alternate link switch. Committing packets to a particular link is achieved by adding router caches. A destination register or a cache is associated with each of the alternate links of the network switch. Each of the caches holds the destination of the last packet that used the link. Upon arrival, a packet checks the content of all caches. If it hits, then it uses the corresponding link; otherwise, the packet is scheduled according to a round-robin policy or other default policy.

DBS has the following advantages:

It has higher throughput and lower message latency while requiring little hardware support;

It reduces the variance of message response time of competing requests; and

It significantly reduces the frequency to access the router table.

Other features and advantages of the invention will be apparent in view of the following detailed description and appended drawings.

BRIEF DESCRIPTION OF THE DRAWINGS

FIG. 1 is a schematic diagram of a network topology utilizing adaptive link sets or "fat pipes";

FIG. 2 is a schematic diagram of a 12-port router;

DESCRIPTION OF THE SPECIFIC EMBODIMENTS

Figures 3, 4:
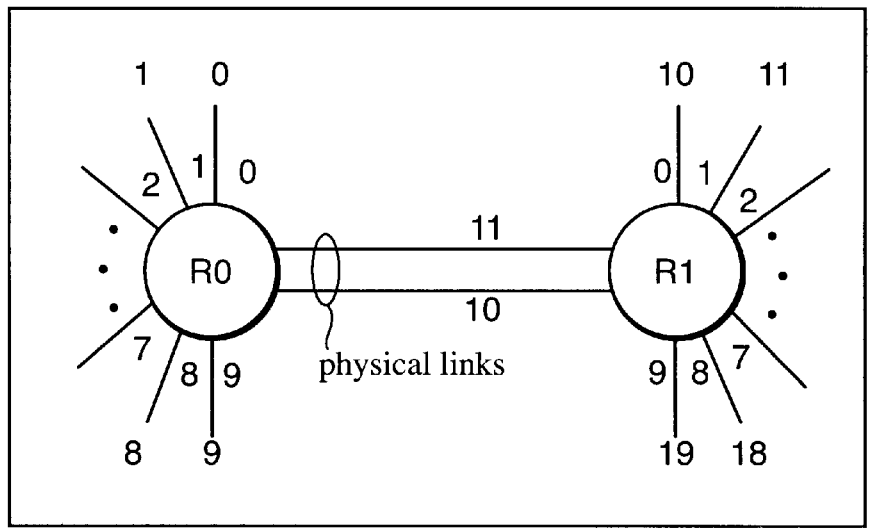
FIG. 3 is a schematic diagram of two routers coupled by a "fat pipe"
FIG. 4 is a block diagram of a cache implementing destination registers as cache line.

A preferred embodiment of the invention will now be described in the context of the ServerNet (SNet) system area network (SAN). SNet I and SNet II are scalable networks that support read, write, and interrupt semantics similar to previous generations I/O busses and are manufactured and distributed by the assignee of the present invention. The ServerNet system I is described in U.S. Pat. No. 5,675,807 which is assigned to the assignee of the present application.

Communication between nodes coupled to ServerNet is implemented by forming and transmitting packetized messages that are routed from the transmitting, or source node, to a destination node by a system area network structure comprising a number of router elements that are interconnected by a bus structure of a plurality of interconnecting links. The router elements are responsible for choosing the proper or available communication paths from a transmitting component of the processing system to a destination component based upon information contained in the message packet.

A router is an intelligent hub that routes traffic to a designated channel. In a ServerNet SAN, the router is a twelve-way crossbar switch that interconnects all of the ServerNet system components (processors, storage, and communications) for unobstructed, high-speed data passing. Each link between routers has a maximum bandwidth determined by the width of the link and the rate of data transfer. Bandwidth may be increased by configuring multiple links between routers as a link set or "fat pipe". Transfers that do not require strict ordering of packets may be implemented by utilizing a fat pipe.

Configuring multiple links to be part of a link set or "fat pipe" allows for higher bandwidth with little change to ServerNet hardware. At the router, a packet has to decide which link of a fat pipe to use.

FIG. 1 depicts a network topology utilizing routers and links. In FIG. 2 end nodes A–F, each having first and second send/receive ports 0 and 1, are coupled by a ServerNet topology including routers R1–R4. Links are represented by lines coupling ports to routers or routers to routers. A first adaptive set (fat pipe) 2 couples routers R1 and R3 and a second adaptive set (fat pipe) 4 couples routers R2 and R4.

Thus, port 0 of end node A, port 0 of end node D, ports 0 and 1 of end node E, and port 0 of end node F may transfer data through the first fat pipe 2.

FIG. 2 is a block diagram of a router chip having twelve fully independent input ports 6, each with an associated output port 8, a routing control block 0, a simple packet interface for use with inband control messages 12, a fully non-blocking 13×13 crossbar 14, an interface for JTAG test and microcontroller connections 16.

Each input module includes receive data synchronizers, elastic FIFOs 20 and 22, and flow control logic. Each input module passes the header information to routing module, which determines the appropriate target port for the packet. The routing module also controls the selection of links in any "fat pipes" using the algorithms described below.

Whenever a particular system element, e.g., a router, determines that its receiving queue (i.e., the elastic buffer input port buffer 20) is nearly full, it will avail itself of the bidirectional capability of a ServerNet link on which it is receiving the incoming message packet and transmit, to the transmitting element at the other end of the link, a BUSY command symbol from the associated transmit port to tell the transmitting element to hold off further transmission. Use of the BUSY command symbol is referred to herein as asserting "backpressure." Routers can propagate backpressure; that is translate received backpressure to transmitted backpressure.

Thus, when scheduling fat pipe links it is important to route incoming packets to a link that is coupled to a destination that is not asserting backpressure. The following describes various scheduling algorithms.

Terminology
- tif: ServerNet Interface.
- BTE: Block Transfer Engine.
- msg latency: Round-trip time of message, from time the request leaves the BTE queue until the response arrives. Queueing time in the BTE queue is not included in msg latency.
- STS: Static Scheduling.
- RRS: Round Robin Scheduling
- SQS: Shortest output port Queue Scheduling
- DBS: Destination Based Scheduling, when the default is not indicated a shortest queue policy is assumed.

Round Robin Scheduling RRS: the winning link is chosen in a round robin manner regardless of the status and the destination. In the case of a fat pipe with two physical links, RRS toggles between both links.

Shortest output port Queue Scheduling SQS: as the name suggests, packets pick the link with the shortest output port queue length. The choice is random in case of a tie.

Destination Based Scheduling DBS: Each physical link of the fat pipe has a register that holds the destination of the last packet that used that link. Upon arrival, a packet checks the content of all registers (done in parallel) if it hits then it uses the corresponding link; otherwise, it defaults to another policy. Shortest queue, round robin, and random default policies may be implemented.

In the fat pipe context, both Shortest Queue and Round Robin attempt to reduce overall response time by balancing the load between links in a fat pipe. While this congestion reduction mechanism performs well under light to moderate load, spreading traffic under heavy load can lead to the spread of congestion as well, which in turn can unnecessarily block more than one link. The basic premise behind the DBS algorithm is to always use the same link if the previous packet is destined to the same address as of the current packet.

The drawback of some multi-link routing algorithms (such as Round-Robin and Shortest Queue) is the lack of cooperation between congestion control and routing. While the goal of these algorithms is to optimize network performance by balancing the load across the alternate links, the algorithms do not address the issue of fairness. Under these schemes, a busy destination can potentially lead to blocking all alternate links, and thus hindering forward progress of other packets. The DBS algorithm maximizes throughput while maintaining some degree of fairness by limiting the number of links that a stream of packets targeting the same destination can use.

The operation of the invention will now be described with reference to FIG. 3 which is a fat pipe with two links 10 and 11 connecting first and second routers 14 and 16.

If Static Scheduling (STS) is used, the link is predetermined according to the target destination address. For the fat pipe of FIG. 3 with two physical links, packets destined to output ports 0 to 4 use link 10, while packets destined to output ports 5 to 9 use link 11.

The DBS algorithm is described by the following pseudocode.

```
//NumPhysLinks: Number of Physical Links in a fat pipe
//destlastpkt[i]: holds the destination of the last packet that
    used link i
//pkt.dest: destination of a received packet
DBS(pkt)
{
for (i=0; i<NumPhysLinks; ++i)
if (pkt.dest == destlastpkt[i]) {oport = i; done = true;
break;}
#ifdef SHORTEST_QUEUE_DEFAULT
if (!done)
{
if all oPort queue lengths the same then
pick an oPort at random
else pick the oPort with the shortest queue
}
update destlastpkt
#endif SHORTEST_QUEUE_DEFAULT
#ifdef ROUND_ROBIN_DEFAULT
if (!done) {pick the oport pointed to by the Round Robin
    pointer}
update the Round Robin pointer
update destlastpkt
#endif ROUND_ROBIN_DEFAULT
#ifdef RANDOM_DEFAULT
if (!done) {pick an oPort at random}
update destlastpkt
#endif RANDOM_DEFAULT
}
```

In preferred embodiment, the destination registers can be implemented as a fully associative cache 40, as depicted in FIG. 4, which can be located in the routing control block 10 of FIG. 2.

At minimum, one destination register is required for each output port and contains the destination ID of the last packet that was routed in that direction. For a 12-port router, a 12 entry fully associative cache can be used by control logic that interprets the packet header. The cache line 41 contains the following fields:

1) destination ID tag (DID) 42;
2) a FAT pipe ID tag (each FAT pipe in the router has a unique ID) (FPID) 44;
3) output port number (this is index number of the cache block indicating the output port number chosen for the last packet that came with that destination ID) (OP#) 46

When a new packet arrives at one of the input ports, the destination ID is decoded from the header, and the control logic looks up the packet's destination ID in the destination register cache 40. If there is a match, the location of match (output port number) is returned and the cache does not have to change. If there is no match, it means that the new packet is to be routed to a new destination and requires storing the new destination ID at the index of the selected output (using the default routing) is required.

Extensions to the cache include adding more entries so that the last n unique destinations that used a given output port can be stored.

The performance of the various algorithms for the simple system of FIG. 3 will now be analyzed. Assume that output port 8 of R0 is connected to a port asserting back-pressure. Under the STS system described above, once a packet destined for port 8 is received link 11 will be blocked. Thus, packets destined for ports 5, 6, 7, and 9 will not be able to be transmitted through the fat pipe until the backpressure on port 8 is relieved.

Turning to round-robin scheduling, RRS, the winning link is determined by toggling between links 10 and 11. If a packet is sent on link 10 to the blocked output port then a following packet to port 8 would be directed to link 11. Thus, both links of the fat pipe would be blocked until the backpressure at on port 8 is relieved.

Turning next to shortest output queue scheduling, a first packet destined for port 8 would be directed to the link with the shortest output queue (say link 10) and that link would be blocked. Following packets would also be directed to link 10 until the output queue of link 11 was shorter than link 10. Then another packet destined for port 8 would block link 10. Thus, both links of the fat pipe would be blocked until the backpressure on port 8 is relieved.

Turning, finally, to destination based scheduling, if a packet destined for port 8 is directed to link 10 the destination register, e.g., cache line 41, corresponding to link 10 is written with an identifier of port 8. Any following packets destined for port 8 will be directed to link 10 by the scheduling controller. Thus, only link 10 will be blocked until the backpressure from port 8 is relieved. Link 11 will remain open for all other port destinations.

If there are no hits on the destination registers for an incoming packet then either STS, RRS, or SQS can be used as a default.

STS does not require any additional hardware support and performs fine as long as the workload is uniformly spread and well behaved (i.e., matches the static allocation). Its main drawback is that its effectiveness quickly degrades in the presence of transient and non-uniform workloads. While RRS and SQS are more adaptive, the fundamental problem with both scheduling policies is that once a link in the fat pipe becomes blocked because of a busy end-node, the chances for the other links to become blocked is very high since under both schemes, the algorithm searches for an alternative path to the same destination, and subsequently blocks all links and impede the progress of other requesters targeting other destinations. DBS nicely avoids this problem by committing requests targeting the same destination to the same physical link, and thus guarantees forward progress.

DBS has the following advantages: It allows for higher throughput and lower latency by avoiding blocking all the links of the fat pipe, and thus hindering forward progress of requests destined to non-hot end-nodes.

It also reduces the variance of message response times of competing requirements. It significantly reduces the frequency to access the router table (a potential problem with routers with a large number of I/O ports).

Under heterogeneous traffic, it requires fewer physical links of the fat pipe in order to achieve the same throughput (reached by Round Robin scheduling) while resulting in lower average message latency.

The invention has now been described with reference to the preferred embodiments. Alternatives and substitutions will now be apparent to persons of skill in the art. In particular, although the invention has been described in the context of fat pipes implemented in a ServerNet topology, the use of the invention will be advantageous in any network requiring rapid switching between alternate links. Accordingly, it is not intended to limit the invention except as provided by the appended claims.

What is claimed is:

1. In a network for transmitting data between source and destination nodes, with the network including multiple hubs, each having a plurality of I/O ports for coupling communication links together, with the network transmitting data as packets having a destination address and a data section, with a plurality of the communication links being pipe links that together form a pipe between a pair of hubs to increase bandwidth between the hubs, a system for scheduling the pipe links, said system comprising:

a plurality of destination registers corresponding to the pipe links, each destination register for storing a destination of the last packet that used the pipe link corresponding to the destination register; and a scheduling controller, coupled to said plurality of destination registers, for determining the pipe link on which to transmit a received packet, with the scheduling controller for checking the destination registers and, if the destination stored in a particular destination register is the same as the destination address of the received packet then transmitting the packet on the pipe link corresponding to the particular destination register.

2. The system of claim 1 wherein, if none of the destinations stored in the destination registers is the same as the destination address of the received packets, then the scheduling controller implements a default scheduling algorithm.

3. The system of claim 1 wherein said destination registers are implemented as cache lines of a fully associative cache.

4. A network for transmitting data between source and destination nodes, with the network comprising:

multiple hubs, each having a plurality of I/O ports for coupling communication links together, with the network transmitting data as packets having a destination address and a data section, with a plurality of the communication links being pipe links that together form a pipe between a pair of hubs to increase bandwidth between the hubs, a system for scheduling the pipe links;

a plurality of destination registers corresponding to the pipe links, each destination register for storing a destination of the last packet that used the pipe link corresponding to the destination register; and a scheduling controller, coupled to said plurality of destination registers, for determining the pipe link to which on which to transmit a received packet, with the scheduling controller for checking the destination registers and, if the destination stored in a particular destination register is the same as the destination address of the received packet then transmitting the packet on the pipe link corresponding to the particular register.

5. A method implemented in a network for scheduling links in a set of links coupling multiple hubs, each hub having a plurality of I/O ports for coupling communication links together, with the network transmitting data as packets having a destination address and data section, with a plurality of the communication links being pipe links that together form a pipe between a pair of hubs to increase bandwidth between the hubs, said method comprising the steps of:

storing as destination data the identity of the last packet that uses each pipe link;

when a new packet is received, checking the destination data to determine whether a destination of the new packet matches destination data; and if yes, routing the new packet on the same pipe link used by a previous packet routed to the same destination.

6. The method of claim 5 further comprising the step of:

routing the new packet using another routing algorithm if the destination data does not match a destination of the new packet.

7. The method of claim 6 wherein said another routing algorithm is selected from the group consisting of static scheduling, shortest queue scheduling, or round robin scheduling.

* * * * *

UNITED STATES PATENT AND TRADEMARK OFFICE
CERTIFICATE OF CORRECTION

PATENT NO. : 6,389,017 B1 Page 1 of 1
DATED : May 14, 2002
INVENTOR(S) : Patel et al.

It is certified that error appears in the above-identified patent and that said Letters Patent is hereby corrected as shown below:

Column 2,
Line 56, reads: "links. In FIG. 2 end nodes A-F, each having first and second" it should read -- links. In FIG. 1 end nodes A-F, each having first and second --.

Column 5,
Line 29, reads: "backpressure at on port 8 is relieved." it should read: -- backpressure on port 8 is relieved. --;
Line 60, reads: "blocks all links and impede the progress of other requesters" it should read: -- blocks all links and impedes the progress of other requesters --.

Signed and Sealed this

Tenth Day of December, 2002

JAMES E. ROGAN
*Director of the United States Patent and Trademark Office*